(12) United States Patent
Watanabe

(10) Patent No.: US 7,447,837 B2
(45) Date of Patent: Nov. 4, 2008

(54) CONTROL DEVICE FOR A RAID DEVICE

(75) Inventor: Takashi Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 377 days.

(21) Appl. No.: 10/938,628

(22) Filed: Sep. 13, 2004

(65) Prior Publication Data
US 2005/0102551 A1 May 12, 2005

Related U.S. Application Data

(63) Continuation of application No. PCT/JP02/02373, filed on Mar. 13, 2002.

(51) Int. Cl.
G06F 12/00 (2006.01)
G06F 13/00 (2006.01)
G06F 13/28 (2006.01)
G06F 11/00 (2006.01)
G06F 17/30 (2006.01)

(52) U.S. Cl. .................. 711/114; 714/5; 714/6; 714/7; 707/202; 711/170

(58) Field of Classification Search .......... 711/114, 711/170; 714/5, 6, 7; 707/202
See application file for complete search history.

(56) References Cited

U.S. PATENT DOCUMENTS

| 5,485,571 | A | * | 1/1996 | Menon | 714/7 |
| 5,502,836 | A | * | 3/1996 | Hale et al. | 711/170 |
| 5,524,204 | A | * | 6/1996 | Verdoorn, Jr. | 714/6 |
| 5,615,352 | A | * | 3/1997 | Jacobson et al. | 711/114 |
| 5,758,118 | A | * | 5/1998 | Choy et al. | 711/114 |
| 6,035,373 | A | * | 3/2000 | Iwata | 711/114 |
| 6,941,420 | B2 | * | 9/2005 | Butterworth et al. | 711/114 |
| 2003/0105923 | A1 | * | 6/2003 | Bak et al. | 711/114 |
| 2004/0073747 | A1 | * | 4/2004 | Lu | 711/114 |
| 2004/0133743 | A1 | * | 7/2004 | Ito et al. | 711/114 |

FOREIGN PATENT DOCUMENTS

| JP | 07-160434 | 6/1995 |
| JP | 08-147111 | 6/1996 |
| JP | 10-063441 | 3/1998 |
| JP | 10-326156 | 12/1998 |
| JP | 11-316654 | 11/1999 |

OTHER PUBLICATIONS

International Preliminary Examination Report mailed Dec. 2, 2004, for corresponding application No. PCT/JP2002/002373.

* cited by examiner

Primary Examiner—Matt Kim
Assistant Examiner—Michael Alsip
(74) Attorney, Agent, or Firm—Staas & Halsey LLP

(57) ABSTRACT

A control device for a RAID device is provided which changes, when one or more disks are added, allocation of segments to existing stripes, each of which have created by use of existing disks, by use of the one or more disks to be added without changing the number of segments that constitute each stripe. The control device obtains one unallocated segment from each of disks, each of which is selected from the existing disks and the one or more disks to be added, the number of disks is equal to the predetermine number of segments to create a stripe. Then the control device creates a new stripe to which the obtained unallocated segment is allocated.

3 Claims, 10 Drawing Sheets

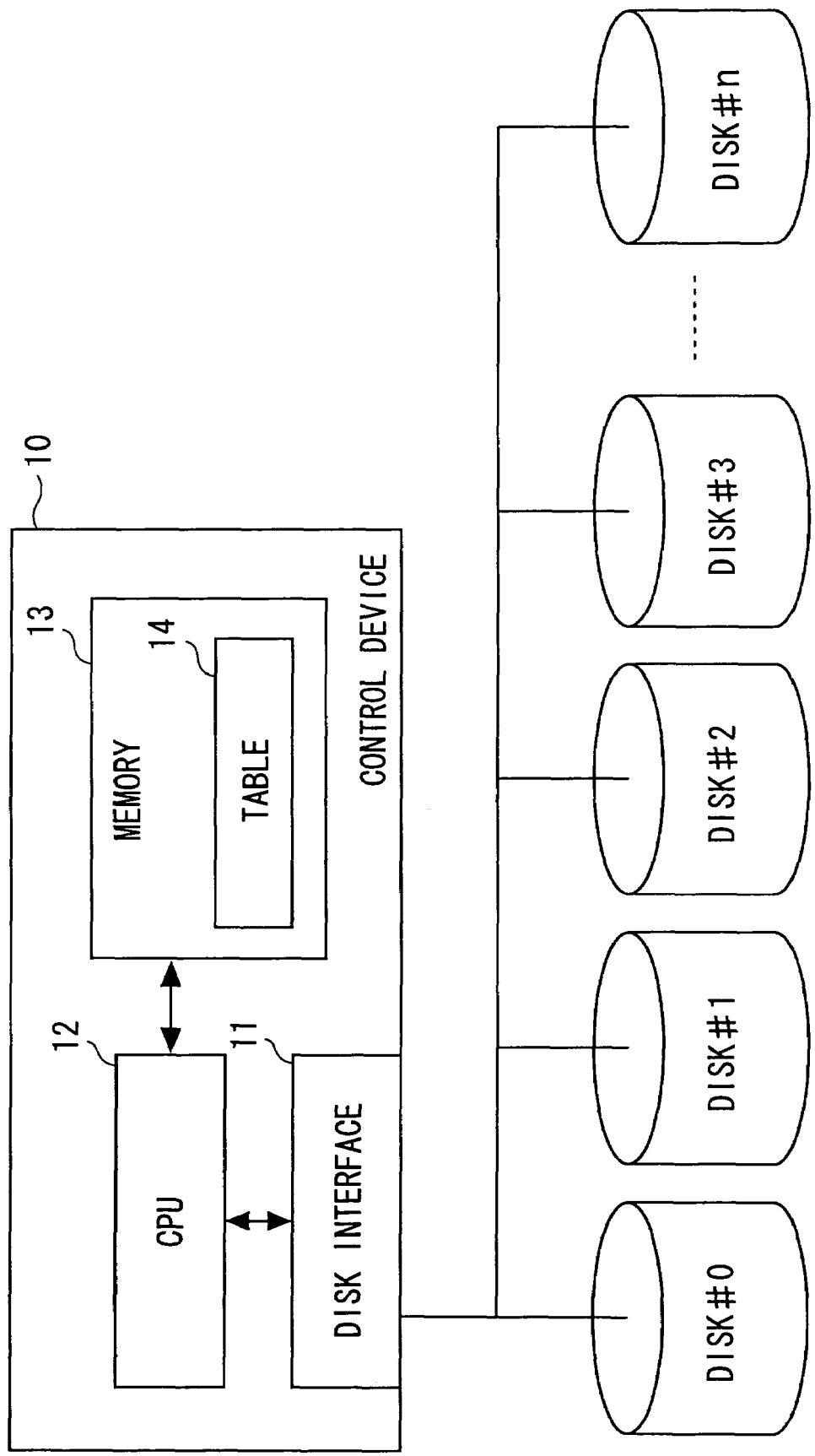

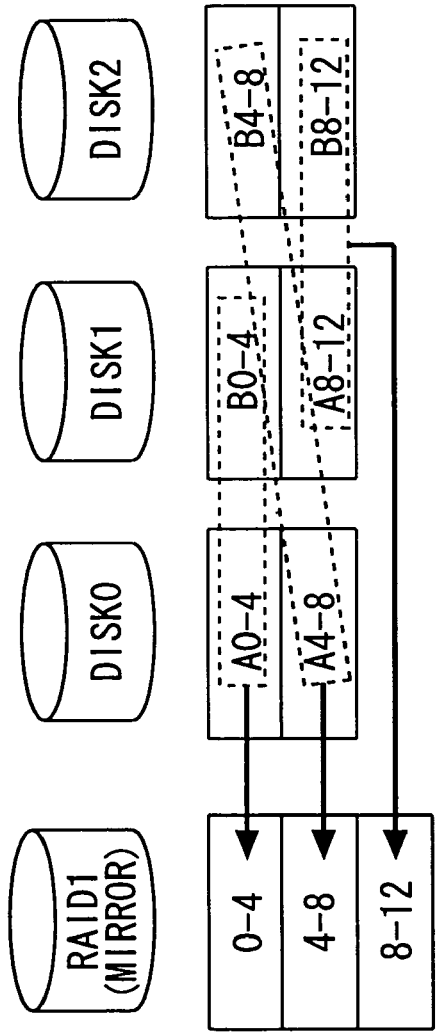

| POSITION IN RAID | RAID#0 | RAID#1 | RAID#2 | RAID#3 |
|---|---|---|---|---|
| 0-15 | DISK0:0-3 (A0) | DISK1:0-3 (A1) | DISK2:0-3 (A2) | DISK3:0-3 (A3) |
| 16-31 | DISK0:4-7 (B0) | DISK1:4-7 (B1) | DISK2:4-7 (B2) | DISK3:4-7 (B3) |
| 32-47 | DISK0:8-11 (C0) | DISK1:8-11 (C1) | DISK2:8-11 (C2) | DISK3:8-11 (C3) |
| 48-63 | DISK0:12-15 (D0) | DISK1:12-15 (D1) | DISK2:12-15 (D2) | DISK3:12-15 (D3) |

| POSITION IN RAID | RAID#0 | RAID#1 | RAID#2 | RAID#3 |
|---|---|---|---|---|
| 0-15 | *DISK4:0-3(A0)* | DISK1:0-3 (A1) | DISK2:0-3 (A2) | DISK3:0-3 (A3) |
| 16-31 | DISK0:4-7 (B0) | *DISK4:4-7(B1)* | DISK2:4-7 (B2) | DISK3:4-7 (B3) |
| 32-47 | DISK0:8-11 (C0) | DISK1:8-11 (C1) | *DISK4:8-11(C2)* | DISK3:8-11 (C3) |
| 48-63 | DISK0:12-15 (D0) | DISK1:12-15 (D1) | DISK2:12-15 (D2) | DISK3:12-15 (D3) |
| 64-79 | DISK0:0-3 (E0) | DISK1:4-7 (E1) | DISK2:8-11 (E2) | *DISK4:12-15(E3)* |

14C

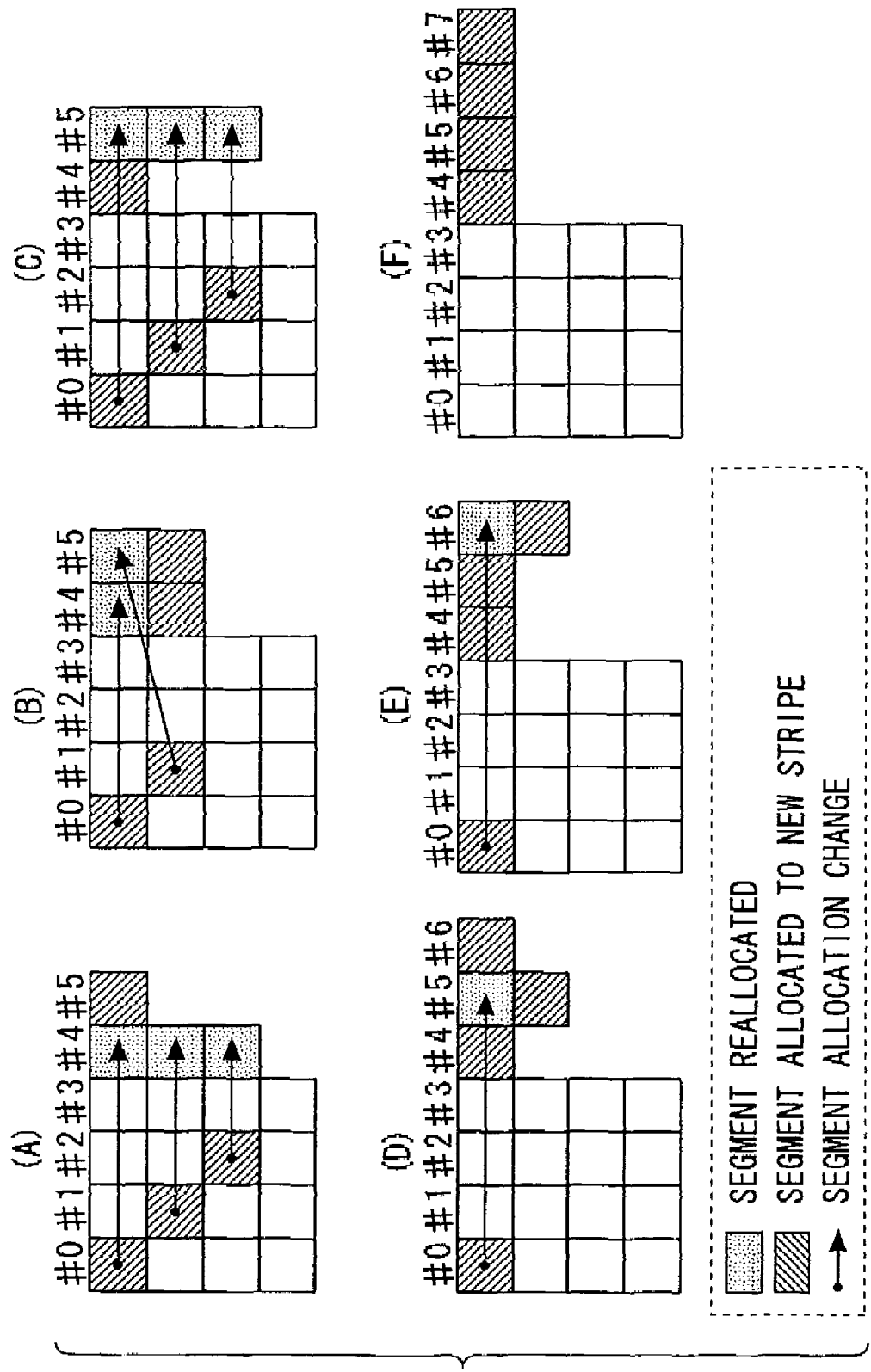

| POSITION IN RAID | RAID#0 | RAID#1 | RAID#2 | RAID#3 |
|---|---|---|---|---|
| 0-15 | DISK0:0-3 (A0) | DISK1:0-3 (A1) | DISK2:0-3 (A2) | DISK3:0-3 (A3) |
| 16-31 | DISK0:4-7 (B0) | DISK1:4-7 (B1) | DISK2:4-7 (B2) | DISK3:4-7 (B3) |

| POSITION IN RAID | RAID#0 | RAID#1 | RAID#2 | RAID#3 |
|---|---|---|---|---|
| 0-15 | DISK0:0-3 (A0) | DISK1:0-3 (A1) | DISK2:0-3 (A2) | DISK3:0-3 (A3) |
| 16-31 | DISK0:4-7 (B0) | DISK1:4-7 (B1) | DISK2:4-7 (B2) | DISK3:4-7 (B3) |
| 32-47 | DISK0:8-11 (C0) | DISK1:8-11 (C1) | DISK2:8-11 (C2) | DISK4:0-3 (C3) |
| 48-63 | DISK0:12-15 (D0) | DISK1:12-15 (D1) | DISK3:8-11 (D2) | DISK4:4-7 (D3) |

14D, S13, S14

CONTROL DEVICE FOR A RAID DEVICE

This application is a continuing application, filed under 35 U.S.C. §111(a), of International Application PCT/JP02/02373, filed Mar. 13, 2002.

BACKGROUND OF THE INVENTION

1. Field of the Invention

The present invention relates to a control device for a RAID (Redundant Array of Independent Disks) device (disk array device).

2. Description of the Related Art

RAID (Redundant Array of Independent Disks) is one of techniques that bring redundancy, less delay, and broad bandwidth to data read/write in a hard disk and that enhance the recoverableness of a hard disk from a crash. Another name of RAID is "disk array".

RAID has an array of combinations of several disk drives (hereinafter a disk drive is simply referred to as "disk"). The physical storage area of each of the disks is divided into small blocks which are fixed in size (for example, 128 MB (megabyte) or 1 GB (gigabyte)). Each of the blocks is called a "segment". One segment is taken from each of the plural disks to together form a virtual space called a "stripe (stripe set)". The allocation unit of a stripe is segment, and each disk provides one segment so that a stripe is allocated with as many segments as necessary to fill a stripe width that is determined in advance. To summarize, a stripe is a virtual space which is obtained by having the plural disks provide one segment each and is accordingly dispersed over the plural disks. The width of a stripe is determined by the number of segments that constitute the stripe. Any data stored in RAID is dispersed over plural disks. When viewed from a user, namely, a host computer, a disk array seems like a single logical storage device or drive (volume). In this way, a disk array composed of a multitude of small disk drives can be used as a single, large-capacity disk drive.

There are various types of RAID to suit different purposes. Typical examples thereof are RAID levels 0, 1, 3, and 5. RAID level 0 is called "striping". In RAID level 0, a stripe is formed in a disk array and data stored is dispersed over plural segments that constitute the stripe. This is for improving the data read/write speed. RAID level 1 is called "mirroring". In RAID level 1, at least two segments in a stripe store the same data. This ensures data redundancy. RAID level 3 is called "bit-or-byte-based striping+fixed parity". In RAID level 3, parity of data striped in bits or bytes across segments is recorded in one disk. RAID level 5 is called "block-based striping+dispersed parity". In RAID level 5, plural segments that constitute a stripe each store different data whereas one of plural segments stores parity information of data stored in other segments. This makes it possible to reconstruct original data from parity information if one of the disks storing data crashes.

Methods given below have conventionally been employed in adding a hard disk to a computer that uses RAID.

CONVENTIONAL EXAMPLE 1

As shown in FIG. 10A, plural disks are newly added to constitute a RAID aside from the existing RAID. The additional RAID is used as a volume distinguished from the existing RAID. Conventional Example 1 has the following problems:

(a) This method requires adding as many disks as the number corresponding to the width of a stripe (the number of segments that constitute the stripe) and therefore is costly.

(b) The computer has to manage two volumes and is placed under an increased burden as a result.

(c) This method forces a user to discriminate the two volumes from each other and use the two accordingly. Also, software cannot be divided between the two volumes, meaning that installing such software in the system is not possible at all.

In Conventional Example 2, which is a method proposed as an improvement of Conventional Example 1, the number of disks added is smaller than a number corresponding to the stripe width, and the added disks and the existing disks are used as one volume.

CONVENTIONAL EXAMPLE 2

As shown in FIG. 10B, one disk that can have as many segments as the number of stripes in the existing RAID is added and then the stripe width of the existing RAID is changed. In the example of FIG. 10B, the stripe width is changed to five-segments wide from four-segments wide.

In order to change the stripe width, Conventional Example 2 has to move almost all of data that has been stored prior to the addition of the disk, which complicates processing for data rearrangement. Furthermore, when data stored in the existing stripes includes parity information as in RAID level 5, a change in stripe configuration requires processing for re-calculation of all parity. Moreover, a program for use to change the stripe width has to be prepared for every RAID level since the data rearrangement and re-calculation of parity cannot be started until the parity configuration is recognized.

SUMMARY OF THE INVENTION

The present invention has been made in view of the above, and an object of the present invention is therefore to provide a control device for a RAID device which is capable of using a disk or disks added and existing disks as a single volume while keeping the load and cost of the addition low.

According to a first aspect of the present invention, there is provided a control device for a RAID device that stores data in a RAID space composed of one or more stripes, each of the stripes being composed of segments of a predetermined number, each of the segments having a fixed size and being obtained by dividing storage area each of disks to create the RAID space, the control device including:

an allocating unit creating a stripe composed of segments of the predetermined number by selecting one arbitrary segment from each of disks and allocating each of the selected segment to a stripe to be created, the number of the disks is equal to the predetermined number; and a storing unit storing allocating condition information, the allocating condition information including a correspondence between each of existing stripes which have created by use of existing disks and each segment allocated to each of the existing stripes, the allocating unit performing processing including:

judging, when one or more disks having segments of at least the predetermined number are added, whether or not a new stripe can be created without changing allocation of segments to the existing stripes;

changing, when it is judged that creating new stripe without changing the current allocation is impossible, the allocation of segments to the existing stripes by use of said one or more disks to be added without changing the number of segments of each of the existing stripes;

obtaining one unallocated segment from each of disks of the predetermined number, each of which is arbitrarily chosen from the existing disks and the one or more disks to be added;

creating a new stripe to which each of the obtained unallocated segments is allocated; and updating the allocation condition information stored in the storing unit based on the change of the allocation of segments to the existing stripes and creating the new stripe.

In the control device for a RAID device according to the first aspect of the present invention, it is desirable that the allocating unit includes:

a judging unit that judges, upon addition of one or more disks each having at least the given number of segments, whether or not a conditional expression, $A(s-1) \leq B$, is satisfied, A representing a count of (the number of) unallocated segments in a disk with the largest number of unallocated segment, B representing the sum of the number of unallocated segments in the other disks that the disk with the largest number of unallocated segment is excluded, s representing the predetermined number of segments;

a specifying unit that specifies, when the conditional expression is not satisfied, a disk (X) with the largest number of unallocated segments and a disk (Y) with the smallest number of unallocated segments, and then chooses, as a specified segment, a segment that is not a segment in the disk (X) from segments included in a stripe including a segment in the disk (Y); and an updating unit that allocates, to the stripe including the specified segment, which has been specified by the specifying unit, an arbitrary unallocated segment of the disk (X), as a substitute segment, instead of the specified segment, and has the storing unit reflect this change in allocation.

In the control device for a RAID device according to the first aspect of the present invention, it is desirable that the allocating unit further include a data rearrangement unit that moves, when data is stored in the specified segment, the data to the substitute segment.

According to a second aspect of the present invention, there is provided a control device for a RAID device that stores data in a RAID space composed of one or more stripes, each of the stripes being composed of segments of a predetermined number, each of the segments having a fixed size and being obtained by dividing storage area each of disks to create the RAID space, the control device for the RAID device including:

an allocating unit that creates a stripe composed of segments of the predetermined number by selecting one arbitrary segment from each of disks and allocating the selected segment to a stripe to be created, the number of the disks is equal to the predetermined number; and a storing unit that stores allocating condition information, the allocating condition information including a correspondence between each of existing stripes which have created by use of existing disks and each segment allocated to each of the existing segments, the allocating unit performing segment allocation processing including:

selecting, upon addition of one or more disks, disks of the predetermined number from the existing disks and said one or more disks to be added in an order that places a disk with the largest unallocated segments count first;

specifying one unallocated segment from each of the selected disks; and allocating each specified segment to a new stripe; and updating the allocation condition information stored in the storing unit based on creating the new stripe.

In the control device for a RAID device according to the second aspect of the present invention, it is desirable that the allocating unit judges, upon addition of one or more disks, whether or not a conditional expression, $D>C/(s-1)$, is satisfied, C representing the number of segments in said one or more disks to be added, D representing the number of unallocated segments in the existing disks and said one or more disks to be added, s representing the predetermined number of segments, and repeats the segment allocation processing as long as the conditional expression is satisfied.

BRIEF DESCRIPTION OF THE DRAWINGS

In the accompanying drawings:

FIG. 1 is a diagram showing an embodiment of a RAID device;

FIGS. 2A, 2B, and 2C are explanatory diagrams of a mapping table;

FIGS. 3A, 3B, and 3C are explanatory diagrams showing how a disk is added to a RAID device in Embodiment 1;

FIGS. 5A and 5B are diagrams showing a mapping table before and after addition of a disk in Embodiment 1;

FIG. 6 is explanatory diagram of a modification example of Embodiment 1;

FIGS. 7A and 7B are explanatory diagrams showing how a disk is added to a RAID device in Embodiment 2;

FIGS. 9A and 9B are diagrams showing a mapping table before and after addition of a disk in Embodiment 2.

DETAILED DESCRIPTION OF THE PREFERRED EMBODIMENTS

Figure 4:
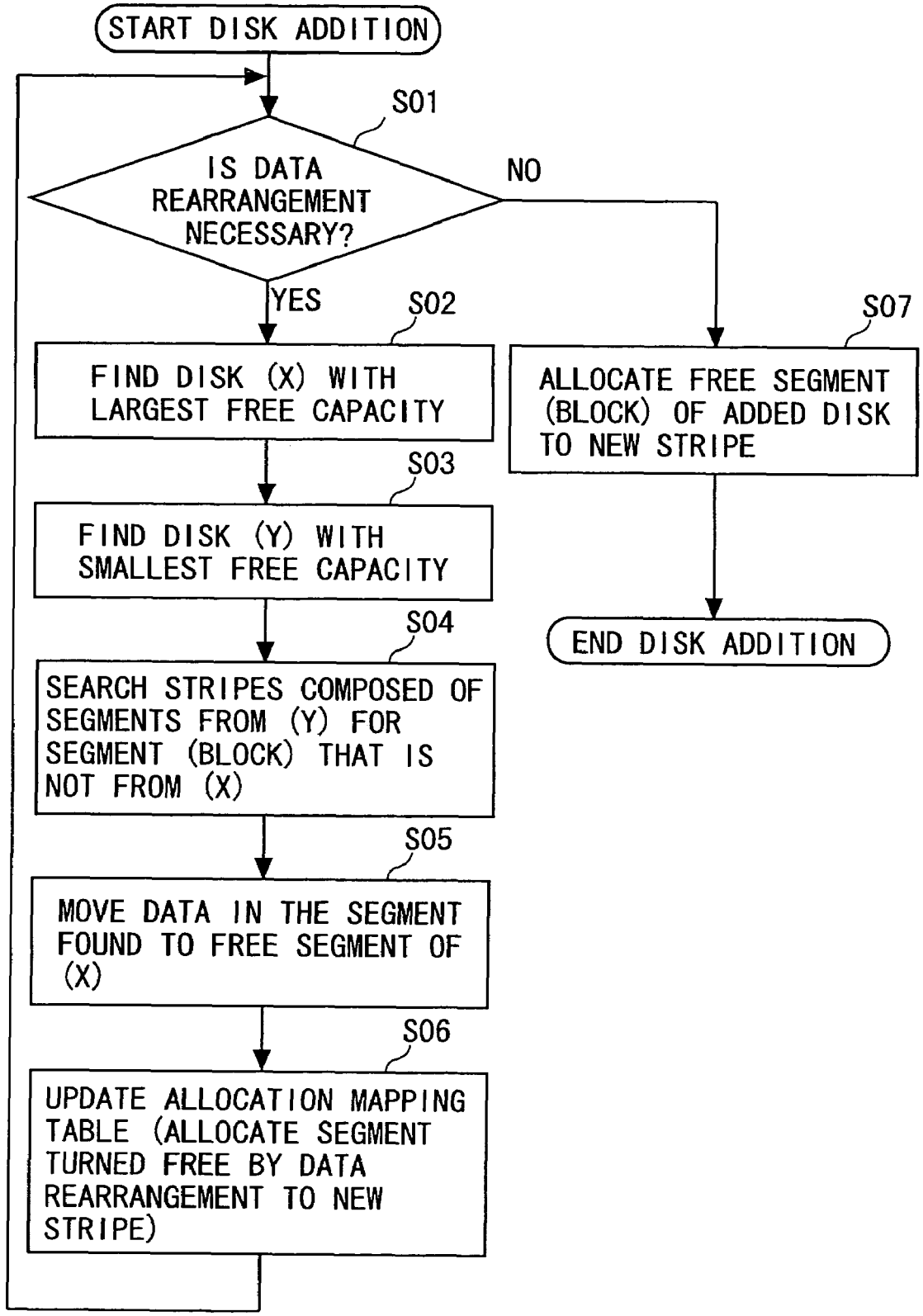
FIG. 4 is a flow chart of allocation processing performed by a CPU upon addition of a disk in Embodiment 1.

Embodiments of the present invention will be described below. Note that the following embodiments are for illustrative purpose only and are not to limit the present invention.

Embodiment 1

FIG. 1 is a diagram showing an embodiment of a RAID device according to the present invention. In FIG. 1, the RAID device has plural (n+1, n is an integer) disk drives (disks), which constitute a disk array, and a control device 10 for controlling the disk array. The control device 10 has a disk interface (I/O) 11, a CPU 12, and a memory 13.

The disk array is composed of at least as many disks as the number of segments that constitute each stripe, depending on the type of the RAID. The disk interface 11 performs data read/write on the disk array following the instruction from the CPU 12. The CPU 12 controls data read/write through the disk interface 11 and creates a RAID space by executing a program stored in the memory 13, for example.

The CPU 12 divides the physical storage area of each of the disks that constitute the disk array into small areas (segments) of fixed size. Each segment is composed of a given number of sectors. Then the CPU 12 collects one segment each from as many disks as the number of segments that constitute a "stripe", to thereby create a stripe of given width. For instance, one segment is specified (chosen) from each of disks #0 to #n shown in FIG. 1 to form a stripe composed of the specified (n+1) segments (to form a stripe of (n+1)-segments wide). Stripes are obtained by having the CPU 12 allocate segments of the disks to the respective stripes each having a predetermined width. An aggregation of the thus created stripes constitutes a RAID. In short, a RAID space is a virtual storage space constituted of a plurality of stripes. The CPU 12 stores, in a mapping table 14 created in the memory 13, the relation obtained through processing of allocating a physical storage space (segment) to a virtual storage space (RAID space (stripe)).

FIGS. 2A to 2C are diagrams showing examples of the mapping table 14. FIG. 2A shows an example of the mapping table 14 for a RAID level 1 (mirroring) composed of three disks (mapping table 14A). FIG. 2B is an explanatory diagram of the mapping table 14A shown in FIG. 2A. FIG. 2C shows an example of the mapping table 14 for a RAID level 0 composed of five disks (mapping table 14B)

In the mapping table 14A of FIG. 2A, the left-hand side column shows the position in a RAID space. Positions "0-4", "4-8", and "8-12" indicate ranges (addresses) in the RAID space of stripes (called "mirrors" in RAID 1) that constitute the RAID space. "0" and "1" in the middle and right-hand side columns indicate the segment number of segments that constitute each stripe. For example, "DISK 0: 0-4" in the column of the segment number "0" and "DISK 1: 0-4" in the column of the segment number "1" indicate areas in disks of segments constituting a stripe. Groups of segments shown in the rows of the block ranges "0-4", "4-8", and "8-12" in the RAID space constitute the stripes.

In the example of FIG. 2A, storage areas of three disks (DISK 0, 1, 2) are each divided into two segments as shown in FIG. 2B. A segment "A0-4" of the disk 0 and a segment "B0-4" of the disk 1 are allocated to a stripe that is at the position "0-4" in the RAID space (stripe "0-4"). A segment "A4-8" of the disk 0 and a segment "B4-8" of the disk 2 are allocated to a stripe that is at the position "4-8" in the RAID space (stripe "4-8"). A segment "A8-12" of the disk 1 and a segment "B8-12" of the disk 2 are allocated to a stripe that is at the position "8-12" in the RAID space (stripe "8-12"). Two segments (for instance, the segments "A0-4" and "B0-4") constituting each stripe store the same data separately, thereby ensuring data redundancy.

In the mapping table 14B shown in FIG. 2C, segments of five disks (DISK 0, 1, 2, 3, 4) are allocated to three stripes "0-16", "16-32", and "32-48" formed in a RAID space in a manner similar to the mapping table 14A.

The mapping table 14B has as many segment number columns (columns showing the segment number of segments that constitute each stripe) as the stripe width, and block ranges in the RAID space are increased by a multiple of the stripe width (the constituent segment count, 4 in this example). In the example of FIG. 2C, the stripe width is 4 (meaning that each stripe is four-segments wide) and accordingly four segment number columns ("0","1 ", "2","3") are prepared, which sets block regions in the RAID space to "0-16", "16-32", and "32-48".

In RAID level 0, data is dispersed over segments that constitute a stripe to be written. When RAID level 4 or 5 is applied to the mapping table 14B instead of RAID level 0, a rule that is suitable for the RAID level employed is followed to disperse and store data in segments of each stripe except a certain segment, where parity information of the dispersed data is stored. Employed as a method to set parity is the conventional method which sets the parity value such that the exclusive OR (XOR) of bits recorded at the same position in the respective segments adds up to 0 or 1 irrespective of the position.

As has been described, the control device 10 (CPU 12) of the RAID device according to Embodiment 1 divides each disk into small sections (segment: 128 megabyte or 1 gigabyte, for example) upon building a RAID. The control device 10 then allocates the segments to stripes that constitute the RAID space. The segment allocation status is mapped onto the mapping table 14, which is kept by the control device 10.

In the case where new disks are added after the mapping table 14 is created, the control device 10 of Embodiment 1 expands the RAID space without changing the width (segment count) of each stripe that constitutes the RAID space. If every segment in the existing disks has already been allocated and the number of disks to be added is short of the stripe width, segments of the additional disks cannot be allocated to any stripe. This is because a stripe is an aggregation of segments of different disks and no two segments from the same disk are allowed in one stripe. Therefore, in such a case, the CPU 12 creates a free space (unallocated segment) in the existing disks by moving data that has been kept in the existing disk to the additional disks, so that the freed space can be used to form a stripe. In other words, segments of the additional disks are allocated to the existing stripes in place of the existing segments. The condition which calls for data rearrangement (change in data allocation) is expressed by the following conditional <Expression 1>:

$$A(s-1) \leq B \qquad \text{<Expression 1>}$$

wherein A represents the remaining capacity of a disk that has the largest remaining capacity, B represents the sum of the remaining capacities of other disks than the disk that has the largest remaining capacity, and s represents the stripe width.

In the Expression 1, the term "remaining capacity" refers to the count of free segments and the term "stripe width" refers to the count of segments that constitute each stripe.

Figures 3A, 3B, 3C:
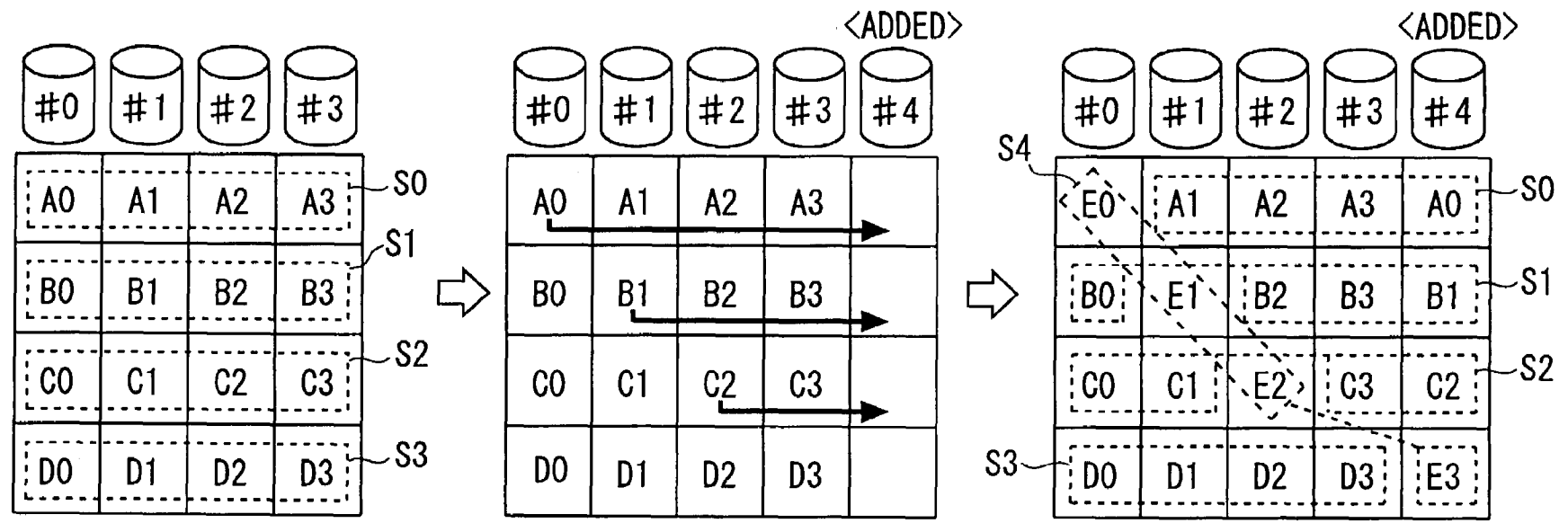

FIGS. 3A to 3C are explanatory diagrams of how segments are allocated upon addition of a disk by the control device 10 of Embodiment 1. FIG. 4 is a flow chart illustrating the allocation method shown in FIGS. 3A to 3C. FIGS. 5A and 5B are diagrams showing changes in a mapping table which are brought by executing the allocation method shown in FIGS. 3A to 3C and FIG. 4.

An example shown in FIGS. 3A to 3C has a plurality of disks which serve as existing disks. There are four existing disks (DISK #0, #1, #2, #3) in this example. The disks #0, #1, #2, and #3 have the same storage capacity and are each divided into four segments. Four stripes S0 to S3 extended over the disks #0, #1, #2, and #3 constitute a RAID space.

FIG. 5A shows a mapping table 14C where which segment is allocated to which stripe in the RAID space of FIG. 3A is mapped out. The mapping table 14C is created in the memory 13 by the CPU 12. In this example, each segment is composed of four sectors and is expressed by disk specifying information and position information ("DISK 0: 0-3", for example).

To be specific, the stripe S0 is allocated with four segments, "DISK 0: 0-3", "DISK 1: 0-3", "DISK 2: 0-3", and "DISK 3: 0-3". The stripe S1 is allocated with four segments, "DISK 0: 4-7", "DISK 1: 4-7", "DISK 2: 4-7", and "DISK 3: 4-7". The stripe S2 is allocated with four segments, "DISK 0: 8-11", "DISK 1: 8-11", "DISK 2: 8-11", and "DISK 3: 8-11". The stripe S3 is allocated with four segments, "DISK 0: 12-15", "DISK 1: 12-15", "DISK 2: 12-15", and "DISK 3: 12-15". Thus the stripes S0 to S3 are each four-segments wide (stripe width: 4).

The stripes S0 to S3 store data in accordance with the RAID level. In this example, data A0 to A3 are stored in the stripe S0, data B0 to B3 are stored in the stripe S, data C0 to C3 are stored in the stripe S2, and data D0 to D3 are stored in the stripe S3. The RAID level in this example is 5 and therefore one of the data stored in each of the stripes S0 to S3 is parity information.

Returning to FIGS. 3A to 3C, assume that one new disk #4 (DISK #4) is added as shown in FIG. 3B. The additional disk #4 has the same storage capacity as the disks #0 to #3, and is divided into four segments. As mentioned above, the disk #4 cannot form a stripe together with the other disks #0 to #3 if the stripes S0 to S3 of the existing disks have already been filled up with data (in other words, if there is no free space). Then the CPU 12 functions as an allocating unit, judging unit, and specifying unit according to the present invention to carry out processing of changing allocation of segments to stripes following the flow chart of FIG. 4.

As shown in FIG. 4, addition of the disk #4 prompts the CPU 12 to judge whether or not data rearrangement (segment allocation change (reallocation)) is necessary with the use of the above Expression 1 (A(s−1)≦B) (Step S01). The processing in Step S01 is described referring to FIG. 3B. The disk that has the largest remaining capacity is the disk #4, and its remaining capacity (the count of free (unallocated) segments) is 4. The value A is therefore 4 (A=4). Other disks than the disk #4, namely, the disks #0 to #3, have no free segments, and the value B is therefore 0 (B=0). The stripe width is 4. When the symbols in Expression 1 are substituted with these values (4 (4 −1)≦0 . . . <Expression 1>), the conditional expression 1 is not satisfied. Therefore data rearrangement is judged to be necessary (S01: YES), and the procedure advances to Step S02. In processing of the subsequent Steps S02 to S05, corresponding targets are searched in accordance with, for example, the order of priority given below where the smaller the number, the higher the priority.

| (Higher Priority ← → Lower Priority) | |
| --- | --- |
| Disk | #0 → #1 → #2 → #3 → #4 |
| Stripe | S0 → S1 → S2 → S3 |

In Step S02, the CPU 12 searches for a disk (X) that has the largest free capacity (the largest count of free segments). The disk (X) in this example is the disk #4.

The CPU 12 then searches for a disk (Y) that has the smallest free capacity (Step S03). The disk (Y) in this example can be the disk #0, #1, #2, or #3. Following the order of priority, the CPU 12 specifies the disk #0 as the disk (Y).

Then the CPU 12 searches stripes that are composed of segments from the disk (Y) for a segment that is not from the disk (X) (Step S04). The disk #0, which is the disk (Y) here, is used to constitute the stripes S0 to S3 and a stripe S4. The CPU 12 specifies (finds) as the corresponding segment the segment A0 (DISK 0: 0-3), which is allocated to the stripe S0. The segment "DISK 0: 0-3" is now referred to as specified segment.

If data contained in the same stripe is stored in the same disk, data redundancy in RAID is lost (meaning that data cannot be reconstructed after disk damage). A segment that stores data to be moved is specified in Step S04 through the above processing in order to avoid allocating more than one segment from the same disk to the same stripe during data rearrangement.

When the disk capacity that is in use (that has already been allocated) is smaller in the disk (X) than in the disk (Y) in Step S04, data to be moved (segment that is to be reallocated) can be found without fail. Therefore, there is always found data to be moved if a disk to be added to a RAID that is composed of disks of equal capacity has the same capacity as each of the existing disks.

Next, the CPU 12 moves data of the segment specified in Step S04 to an arbitrary free segment (substitute segment) of the disk (X) (Step S05). In this example, the head of the storage area of each disk is chosen first as a substitute segment, and the subsequent segments are chosen sequentially. Specifically, the CPU 12 moves the data A0 stored in the segment "DISK 0: 0-3" to the first segment, "DISK 4: 0-3", of the disk #4, which is the disk (X) (see FIG. 3B) The segment "DISK 4: 0-3" here corresponds to the substitute segment. The segment "DISK 0: 0-3" is thus turned into a free (unallocated) segment.

The CPU 12 then updates the mapping table 14C (Step S06). To update the mapping table 14C, the CPU 12 allocates the free segment of the disk (Y) that is created by the data rearrangement in Step S05 (the segment "DISK 0: 0-3" in this example) to a new RAID space (stripe S4) and writes this allocation status in the table (see FIG. 5B).

As has been described, the CPU 12 uses an arbitrary unallocated segment of the disk (X), "DISK 4: 0-3", as a substitute segment to replace the specified segment "DISK 0: 0-3", allocates the substitute segment to the stripe S0 that has been composed of the specified segment "DISK 0: 0-3", and has the table (mapping table 14C) reflect this allocation change.

Thereafter, the procedure returns to Step S01 where the CPU 12 again judges whether or not the conditional expression <Expression 1> is satisfied. This time, the value A is 3 (disk #4) and the value B is 1 (disk #0), so that the conditional expression 1 now reads:

$$3(4-1) \leq 1 \qquad \text{<Expression 1>}$$

Since the conditional expression <Expression 1> is still not satisfied, the CPU 12 once again gives "YES" as the judgment result (data rearrangement is judged to be necessary) and the procedure advances to Step S02. In Step S02, the CPU 12 finds the disk #4 (remaining capacity: 3) to be the disk (X). Following the order of priority, the CPU 12 then specifies the disk #1 (remaining capacity: 0) as the disk (Y) (Step S03).

Next, the CPU 12 searches the stripes that are composed of segments from the disk #1 for a segment that is not from the disk #4 (Step S04). If the segment "DISK 1: 0-3" that stores the data A1 is chosen at this point, it means that two segments from the disk #4 are allocated to the stripe S0. In order to avoid this, the segment "DISK 1: 0-3" is removed from the options and the CPU 12 chooses the segment "DISK 1: 4-7", which constitutes the stripe S1, as a specified segment following the order of priority.

The CPU 12 subsequently moves the data B1 stored in the segment "DISK 1: 4-7" to a free segment "DISK 4: 4-7" (substitute segment) of the disk #4, which corresponds to the disk (Y) (Step S05, see FIG. 3B). The segment"DISK1: 4-7" is thus turned into a free segment.

The CPU 12 then updates the mapping table 14C (Step S06). To update the mapping table 14C, the CPU 12 allocates the segment "DISK 4: 4-7" to the stripe S1, allocates the segment "DISK 1: 4-7" of the disk #1 to the new stripe S4, and has the table reflect this allocation change (see FIG. 5B). Thereafter, the procedure returns to Step S01.

In Step S01, the CPU 12 again judges whether or not the conditional expression <Expression 1> is satisfied. This time, the value A is 2 (disk #4) and the value B is 2 (disks #0 and #1), so that the conditional expression 1 now reads:

$$2(4-1) \leq 1 \qquad \text{<Expression 1>}$$

Since the conditional expression <Expression 1> is still not satisfied, the CPU 12 once again gives "YES" as the judgment result (data rearrangement is judged to be necessary) and the procedure advances to Step S02. In Step S02, the CPU 12 finds the disk #4 (remaining capacity: 2) to be the disk (X). Following the order of priority, the CPU 12 then specifies the disk #2 (remaining capacity: 0) as the disk (Y) (Step S03).

Next, the CPU 12 searches the stripes that are composed of segments from the disk #2 for a segment that is not from the disk #4 (Step S04). The CPU 12 chooses the segment "DISK 2: 8-11", which constitutes the stripe S2, as a specified segment while following the order of priority and avoiding allocating two segments from the disk #4 to the same stripe.

The CPU 12 subsequently moves the data C2 stored in the segment "DISK 2: 8-11" to a free segment "DISK 4: 8-11" (substitute segment) of the disk #4, which corresponds to the disk (Y) (Step S05).

The CPU 12 then updates the mapping table 14C (Step S06). To update the mapping table 14C, the CPU 12 allocates the segment "DISK 4: 8-11" of the disk #4 to the stripe S2, allocates the segment "DISK 2: 8-11" of the disk #2 to the new stripe S4, and has the table reflect this allocation change. Thereafter, the procedure returns to Step S01.

In Step S01, the CPU 12 again judges whether or not the conditional expression <Expression 1> is satisfied. This time, the value A is 1 (any one of the disks #4, #0, #1, and #2) and the value B is 3 (the sum of any three of the disks #4, #0, #1, and #2), so that the conditional expression 1 now reads:

$$1(4-1) \leq 3 \qquad \text{<Expression 1>}$$

Since the conditional expression <Expression 1> is satisfied, the CPU 12 judges that data rearrangement is unnecessary (Step S01: NO), and the procedure advances to Step S07. In Step S07, the CPU 12 allocates a free segment of the additional disk to the new stripe. Specifically, the CPU 12 allocates a free segment of the disk #4, "DISK 4: 12-15", to the stripe S4 and has the mapping table 14C reflect this allocation status (see FIG. 5B). The allocation processing is thus completed.

FIG. 5B is an explanatory diagram of the mapping table 14C after the disk #4 is added, and shows how the addition of the disk #4 has caused changes in allocation of segments to the stripes S0 to S3 creating the new stripe S4 and expanding the storage area of the RAID space (volume).

In FIG. 5B, segments (areas in disks) shown in bold letters are segments to which data has been moved and segments shown in italics are segments of the added disk #4. The segments "DISK 0: 0-3", "DISK 1: 4-7", "DISK 2: 8-11", and "DISK 4: 12-15", which constitute the newly created stripe S4, are used to store data (data and parity information) E0, E1, E2, and E3 (see FIG. 3C).

According to the control device 10 of Embodiment 1, a new stripe is created upon addition of a disk without changing the stripe width, there by expanding the RAID space (volume). This is achieved by moving data (changing allocation of segments to stripes) and rewriting the mapping table of disk areas (segments) that constitute stripes.

In this process, the count of segments that have to be reallocated is much lower than in Conventional Example 2 where the stripe width is changed in accordance with the total count of disks which counts existing disks and every additional disk in. Therefore, processing accompanying addition of a disk is completed quickly allowing the system to return to normal operation in short time.

In the case where data is stored in a segment to be reallocated (specified segment), the data is moved to a substitute segment. No other data than the one stored in the specified segment is moved. Therefore, the amount of data that has to be moved due to addition of a disk in this embodiment may be a fraction of the amount of data moved in Conventional Example 2. From this aspect too the present invention has succeeded in shortening processing that accompanies addition of a disk.

In which part of a stripe in existing disks data is stored is changed as needed (to create a new stripe), but the contents of data stored in existing stripes are not changed (see the stripes S0 to S3 in FIGS. 3C and 5C). Accordingly, there is no need for the CPU 12 to re-calculate parity for the stripes S0 to S3. Since the CPU 12 does not have to re-calculate parity as data is moved, the processing load of the CPU 12 may be reduced.

The processing according to Embodiment 1 (the algorithm shown in Fig, 4) is also applicable to RAID levels 0, 1, 3, and 4. In short, the allocation processing shown in FIG. 4 is executable irrespective of the RAID level. Therefore, whichever RAID level is employed, the same program can be used for segment allocation processing upon addition of a disk.

Embodiment 1 may be modified as follows:

Segments constituting a stripe may be discontinuous between disks since it is sufficient in Embodiment 1 if the mapping table 14 clearly shows which segment constitutes which stripe. Specifically, which disk area (segment) is used may differ from one disk to another as in the stripe S4 shown in FIG. 3C. This makes it possible to change as seen fit the order of priority for disks and segments in the allocation processing which has been described with reference to FIGS. 3A to 5C.

Embodiment 1 has, as existing disks, disks of equal capacity (the same segment count and size) in a number that matches the stripe width in order to fully utilize storage areas of the disks forming a RAID space, and shows an example in which the disk #4 having the same capacity as each of the existing disks is added. From the viewpoint of fully utilizing the storage areas of the disks, the number of disks to be added can be chosen from between 1 and the stripe width (1≦number of additional disks≦stripe width) as long as the count of segments obtained from the added disks matches the stripe width. In short, preferably, disks are added in a number equal to or smaller than the stripe width and have the segment count that corresponds to the stripe width.

FIGS. 6A to 6F are diagrams showing a modification example of Embodiment 1 in which the number of disks is changed without changing the count of segments added by addition of disks. FIGS. 6A to 6F correspond to FIG. 3C and show the state after allocation processing due to addition of disks is completed. In FIGS. 6A to 6F, the stripe configuration of the existing disks (disks #0 to #3) is the same as in FIG. 3A.

FIG. 6A shows an example in which a disk #4 having three segments and a disk #5 having one segment are added. FIG. 6B shows an example in which disks #4 and #5 each having two segments are added. FIG. 6C shows an example in which a disk #4 having one segment and a disk #5 having three segments are added. FIG. 6D shows an example in which disks #4 and #6 each having one segment and a disk #5 having two segments are added. FIG. 6E shows an example in which disks #4 and #5 each having one segment and a disk #6 having two segments are added. FIG. 6F shows an example in which disks #4, #5, #6, and #7 each having one segment are added.

In the examples shown in FIGS. 6A to 6F, the storage areas of the disks can be fully utilized as a single volume by carrying out allocation processing following the flow chart of FIG. 4. The examples of FIGS. 6A to 6F therefore have basically the same effects as the example of FIGS. 3A to 3C.

The description of Embodiment 1 has been given on the premise that data is stored substantially at the same time a segment is allocated to a stripe, in other words, that data is stored in a segment allocated to a stripe. However, it is possible in the present invention to make allocation of a segment to a stripe and storing of data in a stripe separate procedures.

This means that it is possible to construct the present invention by extracting from the description of Embodiment 1 the part pertaining to allocation of segments. In this case, the CPU 12 creates a RAID space by allocating a segment of each disk to a stripe without considering the presence or absence of data to be stored and, upon addition of a disk, judges in Step S01 whether or not allocation of segments to existing stripes is to be changed in order to expand the RAID space through creation of a new stripe.

In Step S01, the values A and B in the conditional expression <Expression 1> which represent the "remaining capacity" show the count of unallocated segments, and whether or not data is stored in allocated segments does not matter. Similarly, the "free capacity" in Steps S02 and S03 refers to the count of unallocated segments. In Step S04 where in Embodiment 1 a segment that stores data to be moved is specified, a segment to be allocated to a new stripe is specified instead. Step S05 in this case is an additional step that is carried out when the specified segment happens to have data stored therein.

Embodiment 2

Embodiment 2 of the present invention will be described next. The description of Embodiment 2 centers on differences from Embodiment 1 since there are commonalities between Embodiments 1 and 2. A RAID device in Embodiment 2 has the same system configuration as the one shown in FIG. 1. Embodiment 2 is identical with Embodiment 1 in that the RAID device has plural disks (a disk array), which constitute a RAID space, and a control device 10 for controlling the disk array, and in that a CPU 12 creates in a memory 13 a mapping table 14 showing which segments of the disks are allocated to which stripes. However, the CPU 12 in this embodiment performs allocation processing that is different from the allocation processing of Embodiment 1.

Figures 7A, 7B:
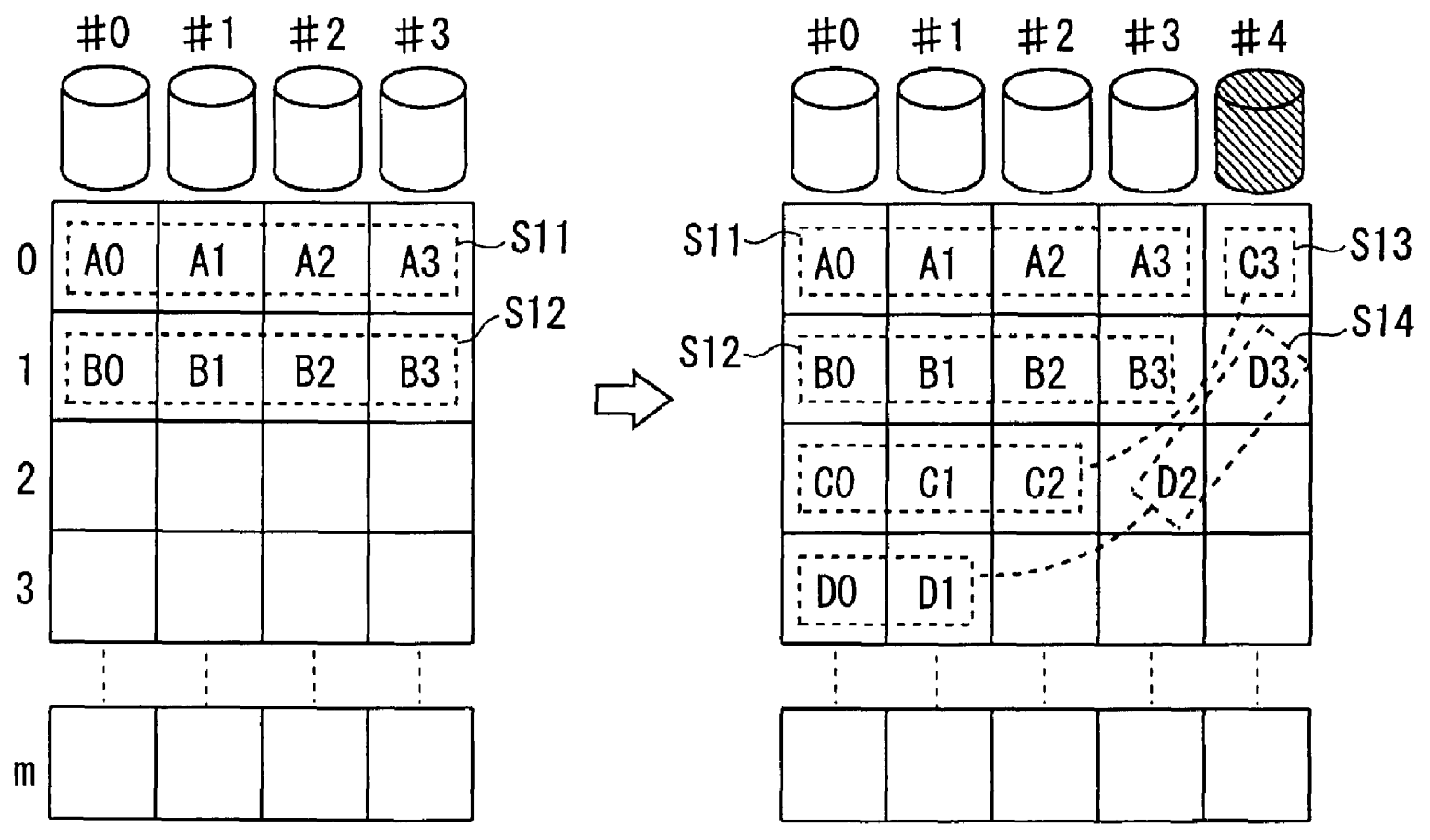
Figure 8:
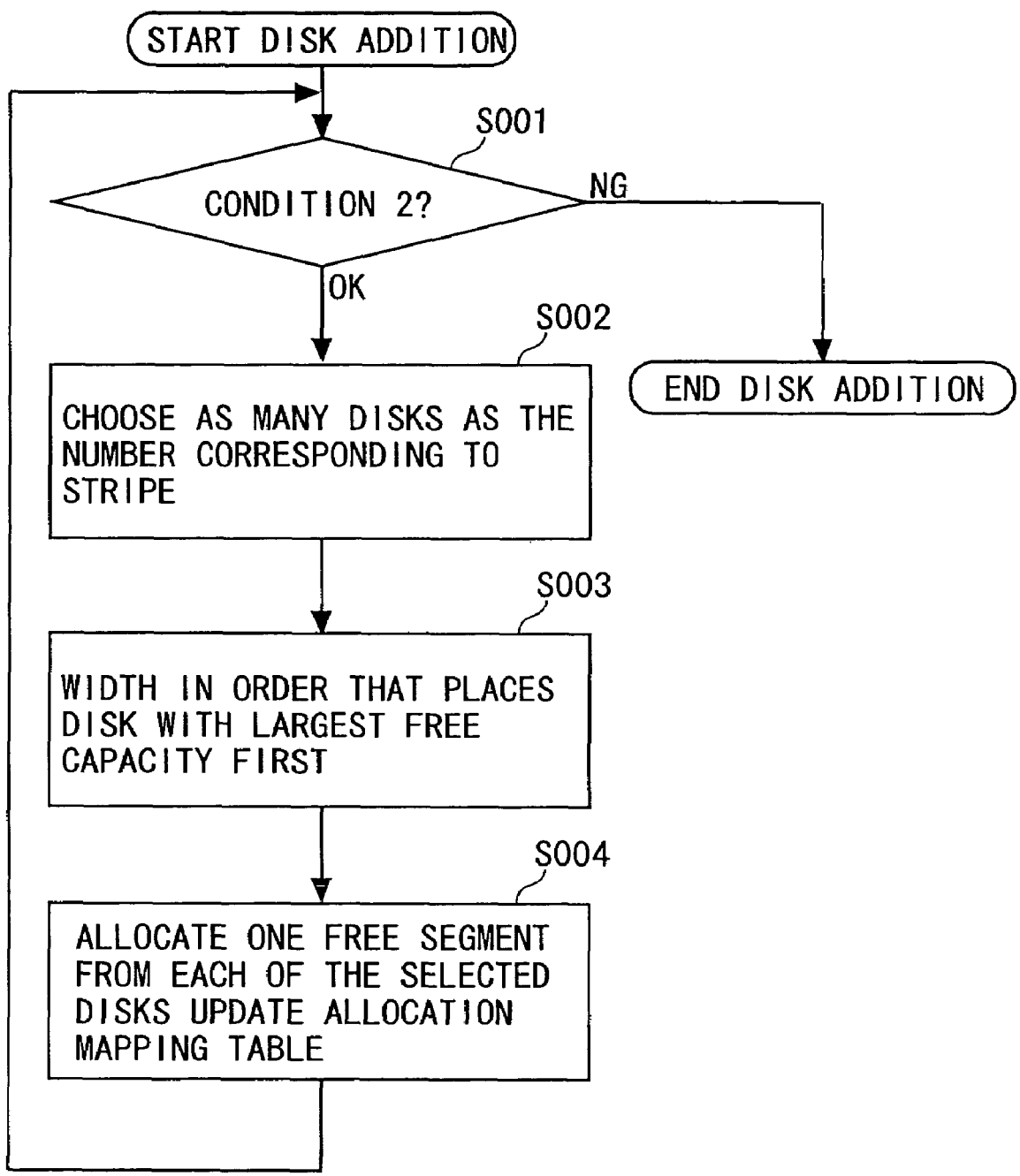
FIG. 8 is a flow chart of allocation processing performed by a CPU upon addition of a disk in Embodiment 2.
Figures 10A, 10B:
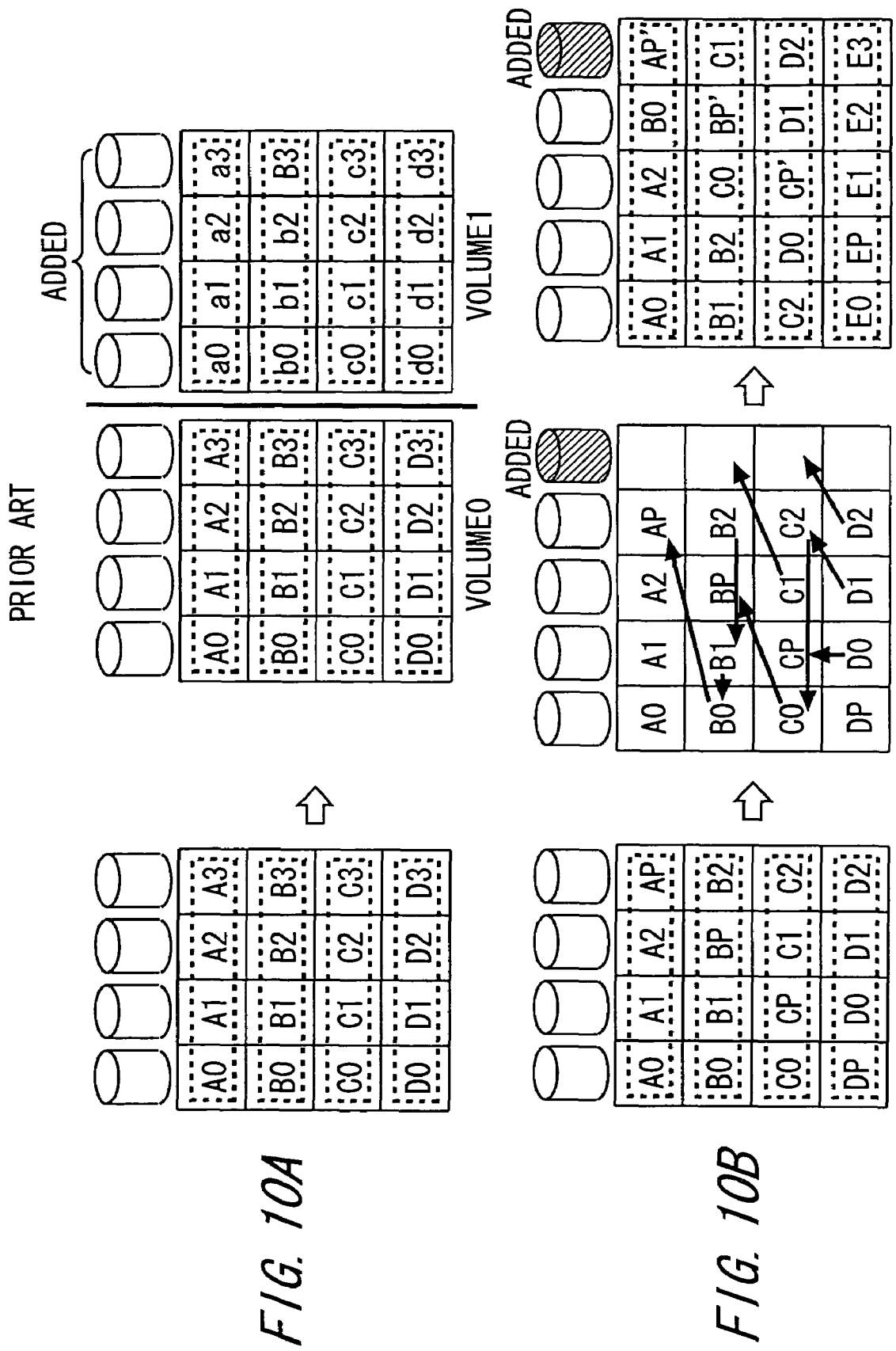
FIGS. 10A and 10B are explanatory diagrams of prior art.

FIGS. 7A and 7B are diagrams showing a segmental location method carried out upon disk addition by the control device 10 of the RAID device according to Embodiment 2 of the present invention. FIG. 8 is a flow chart illustrating the segment allocation method of FIGS. 7A and 7B. FIGS. 9A and 9B are diagrams showing an example of the mapping table 14 (mapping table 14D) before and after segments are allocated as shown in FIGS. 7A and 7B.

As shown in FIG. 7A, four disks (DISK #0, #1, #2, #3) form as existing disks a disk array in Embodiment 2. The disks #0 to #3 each have (m+1) segments (m is an integer equal to or larger than 1) Stripes S11 and S12 are extended over the disks #0 to #3.

As shown in the mapping table 14D of FIG. 9A, the stripe S11 to which segments "DISK 0: 0-3", "DISK 1: 0-3", "DISK 2: 0-3", and "DISK 3: 0-3" are allocated is created at a position "0-15" in the RAID space (position in RAID) whereas the stripe S12 to which segments "DISK 0: 4-7", "DISK 1: 4-7", "DISK 2: 4-7", and "DISK 3: 4-7" are allocated is created at a position "16-31" in the RAID space.

Other areas of the disks #0 to #3 than those constituting the stripes are unused (unallocated) as shown in FIG. 7A. Thus the CPU 12 in Embodiment 2 creates stripes in a manner that leaves unallocated segments in the existing disks #0 to #3.

Assume here that a new disk #4 having the same capacity (having (m+1) segments) as each of the existing disks #0 to #3 is added as shown in FIG. 7B, and that the CPU 12 is instructed to create new stripes S13 and S14. In this disk addition, the CPU 12 functions as an allocating unit and a judging unit, and performs segment allocation processing following the flow chart of FIG. 8.

The first step executed by the CPU 12 in FIG. 8 is to judge whether or not Condition 2 expressed by the following conditional expression <Expression 2> is fulfilled:

$$D > C/(s-1) \qquad \text{<Expression 2>}$$

wherein C represents the capacity of one additional disk, D represents the sum of the capacities (count of segments) of unallocated disk areas, and s represents the stripe width.

Here, s is substituted with 4 for simplification, making C into 5 and D into 17. The expression now reads:

$$17 > 5/(4-1).$$

When Condition 2 is met like this, the CPU 12 gives OK as the result of judgment in Step S001 and the procedure advances to Step S002.

In Step S002, the CPU 12 chooses a number of disks that corresponds to the stripe width (the count of segments that constitute a stripe) one by one in an order that places the disk having the largest free capacity (the highest count (largest number) of unallocated segments) first.

In this example, the additional disk #4 is chosen first and remaining three disks are selected from the existing disks #0 to #3. If at this point there are several disks that have the same free capacity, the CPU 12 chooses one following a given order of priority. For instance, a smaller disk number is given higher priority. Chosen as a result are the disk #4 and the disks #0 to #2.

The CPU 12 then specifies one free segment from each of the selected disks, and allocates the specified segments to a new stripe S13 (Step S003). As shown in FIG. 9B, the CPU 12 in this example allocates a segment "DISK 0: 8-11" of the disk #0, a segment "DISK 1: 8-11" of the disk #1, a segment "DISK 2: 8-11" of the disk #2, and a segment "DISK 4: 0-3" of the disk #4 to the stripe S13. These segments are allocated such that the head of the storage area of each disk is used first and the subsequent segments are used sequentially.

The CPU 12 then updates the mapping table 14D in accordance with the allocation result (Step S004). The procedure returns to Step S001 where the CPU 12 judges whether or not Condition 2 is met. This time, the value C is 5 and the value D is 13, so that the conditional expression 2 now reads:

$$13 > 5/(4-1).$$

Since Condition 2 is fulfilled, the CPU 12 gives OK as the result of judgment in Step S001 and the procedure advances to Step S002.

In Step S002, the CPU 12 chooses a number of disks that corresponds to the stripe width (the count of segments that constitute a stripe) one by one in an order that places the disk having the largest free capacity (the highest count (largest number) of unallocated segments) first. In this example, the additional disk #4 is chosen first and next the disk #3. Remaining two disks are selected from the existing disks #0 to #2 following a given order of priority. Here, the disks #0 and #1 are chosen.

The CPU 12 then specifies one free segment from each of the selected disks, and allocates the specified segments to a new stripe S14 (Step S003). As shown in FIG. 9B, the CPU 12 in this example allocates a segment "DISK 0: 12-15" of the disk #0, a segment "DISK 1: 12-15" of the disk #1, a segment "DISK 3: 8-11" of the disk #3, and a segment "DISK 4: 4-7" of the disk #4 to the stripe S14.

The CPU 12 then updates the mapping table 14D in accordance with the allocation result (Step S004), and completes the processing. In this way, new areas "32-47" (stripe S13) and "48-63" (stripe S14) are created in the RAID space by addition of the disk #4 (see FIGS. 7B and 9B).

Note that when Condition 2 is not fulfilled in Step S001 of FIG. 8 (Step S001: NG), allocation processing accompanying disk addition is ended. Alternatively, the processing of Steps S001 to S004 may be repeated until NG is announced as the result of the judgment in Step S001 after addition of a disk.

According to Embodiment 2, new stripes are created by adding a disk in a manner that avoids reallocation of segments to the existing stripes (change in segment allocation). Data rearrangement accompanying segment reallocation is thus eliminated. Since the CPU 12 in the control device 10 of Embodiment 2 does not need to perform such processing as segment reallocation (changes in segment allocation), data rearrangement, and re-calculation of parity, the load of the CPU 12 is even smaller than in Embodiment 1.

What is claimed is:

1. A control device for a RAID (Redundant Array of Independent Disks) device that stores data in a RAID space composed of one or more stripes, each of said one or more stripes being composed of segments of a predetermined number, each of the segments having a fixed size and being obtained by dividing storage area of each of disks to create the RAID space, the control device comprising:
    an allocating unit creating a stripe composed of segments of the predetermined number by selecting one arbitrary segment from each of disks and allocating each of the selected segment to the stripe to be created, the number of disks is equal to the predetermined number; and
    a storing unit storing allocating condition information, the allocating condition information including a correspondence between each of existing stripes which have created by use of existing disks and each of segment allocated to each of the existing stripes, wherein the allocating unit performs processing including:
    judging, when one or more disks having segments of at least the predetermined number are added, whether or not a new stripe can be created without changing allocation of segments to the existing stripes;
    changing, when it is judged that creating the new stripe without changing the current allocation is impossible, the allocation of segments to the existing stripes by use of said one or more disks to be added without changing the predetermined number of segments of each of the existing stripes;
    obtaining one unallocated segment from each of disks of the predetermined number, each of which is arbitrarily chosen from the existing disks and said one or more disks to be added;
    creating a new stripe to which each of the obtained unallocated segment is allocated; and
    updating the allocation condition information stored in the storing unit based on the change of the allocation of segments to the existing stripes and creating the new stripe,
    wherein the allocating unit comprises:
    a judging unit judging, upon addition of one or more disks having segments of at least the predetermined number, whether or not a conditional expression, $A(s-1) \leq B$, is satisfied, A representing the number of unallocated segments, B representing the sum of the number of unallocated segments in the other disks that the disk with the largest number of unallocated segments is excluded, s representing the predetermined number of segments;
    a specifying unit specifying, when the conditional expression is not satisfied, a disk (X) with the largest number of unallocated segments and a disks (Y) with the smallest number of unallocated segments, and then selecting, as a specified segment, a segment that is not a segment in the disk (X) from segments included in an existing stripe including a segment in the disk (Y); and
    an updating unit allocating, to the stripe including the specified segment, which has been specified by the specifying unit, an arbitrary unallocated segment in the disk (X) as a substitute segment instead of the specified segment, and has the storing unit reflect this change in allocation.

2. A control device for RAID device as claimed in claim 1, wherein the allocating unit further comprises a data rearrangement unit that moves, when data is stored in the specified segment, the data to the substitute segment.

3. A control device for a RAID (Redundant Array of Independent Disks) device that stores data in a RAID space composed of one or more stripes, each of the stripes being composed of a predetermined number of segments, each of the segments having a fixed size and being obtained by dividing storage area of each of disks to create the RAID space, the control device comprising:
    an allocating unit creating a stripe composed of segments of the predetermined number by selecting one arbitrary segment from each of disks and allocating each of the selected segment to the stripe to be created, the number of disks is equal to the predetermined number; and
    a storing unit storing allocating condition information, the allocating condition information including a correspondence between each of existing stripes which have created by use of existing disks and each segment allocated to each of the existing stripes,
    wherein the allocating unit performs segment allocation processing including:
    selecting, upon addition of one or more disks, disks of the predetermined number from the existing disks and said one or more disks to be added in an order that places a disk with the largest number of unallocated segments first;
    specifying one unallocated segment from each of the selected disks;
    allocating each specified segment to a new stripe; and
    updating the allocation condition information stored in the storing unit based on creating the new stripe,
    wherein the allocating unit judges, upon addition of one or more disks, whether or not a conditional expression, $D > C/(s-1)$, is satisfied, C representing the number of segments in said one or more disks to be added, D representing the number of unallocated segments in the existing disks and the one or more disks to be added, s representing the predetermined number of segments, and repeats the segment allocation processing as long as the conditional expression is satisfied.

* * * * *

UNITED STATES PATENT AND TRADEMARK OFFICE
CERTIFICATE OF CORRECTION

| | | |
|---|---|---|
| PATENT NO. | : 7,447,837 B2 | Page 1 of 1 |
| APPLICATION NO. | : 10/938628 | |
| DATED | : November 4, 2008 | |
| INVENTOR(S) | : Takashi Watanabe | |

It is certified that error appears in the above-identified patent and that said Letters Patent is hereby corrected as shown below:

Column 14, Line 23, after "for" insert --a--.

Signed and Sealed this

Third Day of February, 2009

JOHN DOLL
*Acting Director of the United States Patent and Trademark Office*